(12) United States Patent
Usami

(10) Patent No.: US 8,704,918 B2
(45) Date of Patent: Apr. 22, 2014

(54) IMAGE CORRECTION APPARATUS AND IMAGE CORRECTION METHOD

(75) Inventor: Takahiro Usami, Yokohama (JP)

(73) Assignee: JVC Kenwood Corporation, Yokohama-shi (JP)

( * ) Notice: Subject to any disclaimer, the term of this patent is extended or adjusted under 35 U.S.C. 154(b) by 309 days.

(21) Appl. No.: 13/161,085

(22) Filed: Jun. 15, 2011

(65) Prior Publication Data

US 2012/0044387 A1    Feb. 23, 2012

(30) Foreign Application Priority Data

Aug. 20, 2010 (JP) .................................. 2010-185189

(51) Int. Cl.
*H04N 5/217* (2011.01)

(52) U.S. Cl.
USPC ......... 348/241; 348/240.3; 348/335; 382/275

(58) Field of Classification Search
USPC .............. 348/241, 335, 607, 908, 909, 222.1, 348/240.3; 382/275, 274
See application file for complete search history.

(56) References Cited

U.S. PATENT DOCUMENTS

| 2003/0218683 A1 | 11/2003 | Kurase |
| 2005/0007477 A1 | 1/2005 | Ahiska |
| 2009/0015694 A1 | 1/2009 | Saito |

FOREIGN PATENT DOCUMENTS

| EP | 1 650 705 A1 | 4/2006 |
| JP | 2006-222827 | 8/2006 |
| JP | 2007-180898 | 7/2007 |
| JP | 2007-267379 | 10/2007 |
| JP | 2009-017419 | 1/2009 |

OTHER PUBLICATIONS

Extended European Search Report in European Patent Application No. 11006773.3 dated Jan. 25, 2013.
Office Action in Japanese Patent Application No. 2010-185189 dated Dec. 18, 2012.

*Primary Examiner* — Paul Berardesca
(74) *Attorney, Agent, or Firm* — Venable LLP; Michael A. Sartori; F. Brock Riggs

(57) ABSTRACT

A line memory stores sequentially image data captured through optical lenses. A distortion correction value storage stores distortion correction values used in the correction of optical distortion occurring in the image data due to distortion aberration present in the optical lens. An image data control unit selects pixels of image data stored in the line memory as pixels to be corrected for the correction of optical distortion respectively. Then the image data control unit determines a region for use in correction, having the fixed number of pixels horizontally and the fixed number of lines vertically, based on the positions of the pixels to be corrected and the distortion correction values obtained from the distortion correction value storage. Here, the region contains a plurality of pixels for use in correction of the pixels to be corrected. Then the image data control unit reads out the image data from the line memory. A distortion correction unit determines pixel values for the pixels to be corrected, based on (1) the pixels for use in correction, which are contained in the image data, within the region for use in correction, and (2) the distortion correction values.

8 Claims, 16 Drawing Sheets

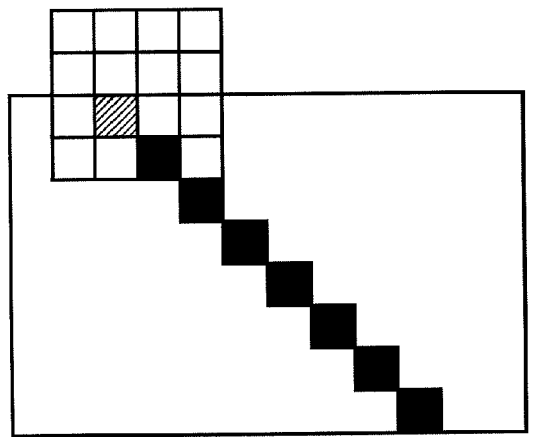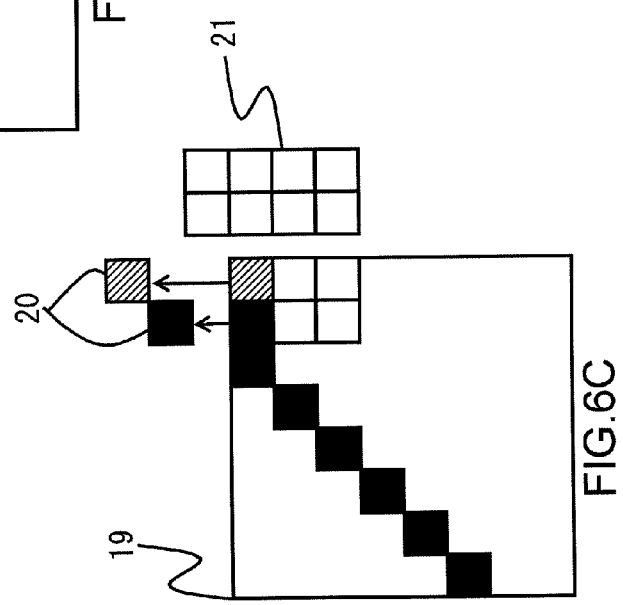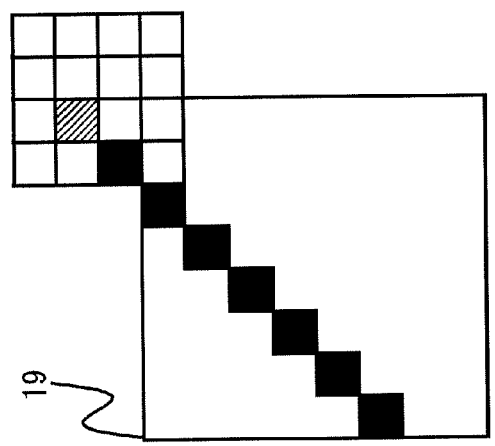
FIG.6B
FIG.6C
FIG.6A

IMAGE CORRECTION APPARATUS AND IMAGE CORRECTION METHOD

BACKGROUND OF THE INVENTION

1. Field of the Invention

The present invention relates to an image correction apparatus that captures a subject image through an optical lens and records image data representing the subject image.

2. Description of the Related Art

Optical lenses normally have their unique distortion aberration resulting from variations in manufacture or such other causes. Thus, capturing subject images through these optical lenses produces a phenomenon called optical distortion in which a picked-up image is distorted by the aforementioned distortion aberration. It is known that the amount of such optical distortion varies with the lens zoom value in the image capturing. There have been various propositions for technology concerning the correction of optical distortion in image pickup apparatuses, and one among them is a technology to realize more efficient use of memory region in correcting the optical distortion (See Reference (1) in the following Related Art List, for instance).

RELATED ART LIST (1) Japanese Unexamined Patent Publication No 2006-222827.

Generally, correction of optical distortion requires the presence of a main memory for storing image data containing optical distortion and cache memory for temporarily storing the image data read out from the main memory. Yet, these memories are expensive and the memory access involves computation cost, so that there is much demand for technology that realizes more efficient memory access while restricting the size of memory to be carried by the image pickup apparatus.

SUMMARY OF THE INVENTION

The present invention has been made in view of the foregoing circumstances, and a purpose thereof is to provide a technology that realizes a function of correcting optical distortion while minimizing the amounts of main memory and cache memory.

In order to achieve the purpose thereof, one embodiment of the present invention provides an image correction apparatus. The image correction apparatus includes: a line memory for a predetermined number of lines configured to store sequentially image data obtained by image pickup via an optical lens; a distortion correction value storage configured to store a distortion correction value, which is a predetermined value to be used in the correction of optical distortion occurring in the image data due to distortion aberration present in the optical lens; an image data control unit configured to select pixels of image data stored in the line memory as pixels to be corrected for the correction of optical distortion respectively, configured to determine a region for use in correction having a fixed number of pixels horizontally and a fixed number of lines vertically, the region containing a plurality of pixels for use in correction of the pixels to be corrected, based on the positions of the pixels to be corrected and distortion correction value obtained from the distortion correction value storage, and configured to read out image data within the region for use in correction from the line memory; and a distortion correction unit configured to determine pixel values for the pixels to be corrected based on (1) the pixels for use in correction, which are contained in the image data, within the region for use in correction, read out by the image data control unit, and (2) the distortion correction value.

Another embodiment of the present invention provides an image correction method. The image correction method includes: storing sequentially image data obtained by image pickup via an optical lens, in a line memory for a predetermined number of lines; acquiring a distortion correction value from a distortion correction value storage wherein the distortion correction value storage stores a distortion correction value, which is a predetermined value to be used in the correction of optical distortion occurring in the image data due to distortion aberration present in the optical lens; selecting pixels of image data stored in the line memory as pixels to be corrected for the correction of optical distortion respectively, determining a region for use in correction having a fixed number of pixels horizontally and a fixed number of lines vertically, the region containing a plurality of pixels for use in correction of the pixels to be corrected, based on the positions of the pixels to be corrected and the distortion correction value obtained from the distortion correction value storage, and reading out image data within the region for use in correction, from the line memory; and determining pixel values for the pixels to be corrected based on (1) the pixels for use in correction, which are contained in the image data, within the region for use in correction, read out by the image data control unit, and (2) the distortion correction value.

Optional combinations of the aforementioned constituting elements, and implementations of the invention in the form of methods, apparatuses, systems, recording mediums, computer programs and so forth may also be effective as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIGS. 6A to 6C are diagrams for explaining a termination processing in pixel interpolation by a distortion correction unit;

DETAILED DESCRIPTION OF THE INVENTION

The invention will now be described by reference to the preferred embodiments. This does not intend to limit the scope of the present invention, but to exemplify the invention.

First Embodiment

A first embodiment of the present invention will be outlined below. An image correction apparatus 100 according to a first embodiment performs correction processings by loading image data for use in correction, in units of fixed-size blocks, from line memory to cache memory when correcting the optical distortion of image data using an image interpolation technique.

Figure 1:
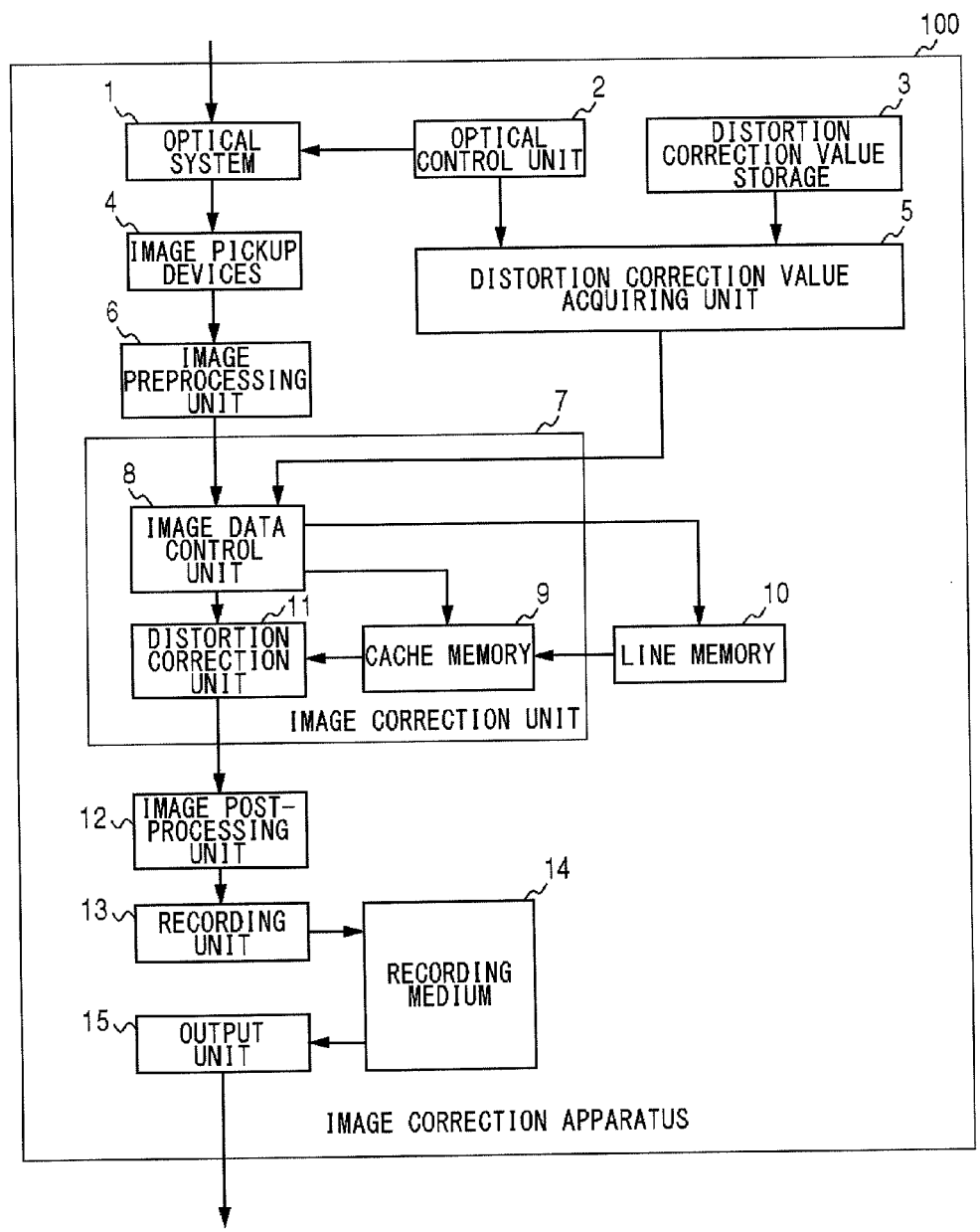
FIG. 1 is a schematic diagram showing an internal structure of an image correction apparatus according to a first embodiment.

FIG. 1 is a schematic diagram showing an internal structure of the image correction apparatus 100 according to the first embodiment. The image correction apparatus 100 includes an optical system 1, an optical control unit 2, a distortion correction value storage 3, image pickup devices 4, a distortion correction value acquiring unit 5, an image preprocessing unit 6, an image correction unit 7, a line memory 10, an image post-processing unit 12, a recording unit 13, a recording medium 14, and an output unit 15.

The optical system 1, which is comprised of a plurality of lenses including a zoom lens, acquires optical information from a subject as a focused image. The image pickup devices 4 convert optical information sent from the optical system 1 into electrical information. The image pickup devices 4 can be implemented by the use of CMOS (Complementary Metal Oxide Semiconductor) image sensors or CCD (Charge-Coupled Device) image sensors, for instance.

The image preprocessing unit 6 converts the electrical information after conversion by the image pickup devices 4, into signals of RGB colors. The line memory 10 records the RGB signals, after conversion by the image preprocessing unit 6, for all the pixels of a plurality of lines where the picture elements are assumed as a plane with pixels in the horizontal direction and lines in the vertical direction. Note, however, that the line memory 10, which does not have a capacity to record all the RGB signals of image data for a whole image, records part of the image data as partial image data. Accordingly, when the line memory 10 becomes full, data is recorded in a new line by sequentially deleting lines starting from the highest-order (uppermost) line.

The optical control unit 2 controls the lenses of the optical system 1. The optical control unit 2 also outputs a zoom value of the optical system 1 when an image is picked up. The distortion correction value storage 3 stores a plurality of sample values of the zoom value of the optical system 1 and "distortion correction values" (to be discussed in detail later) for use in correcting the distortion of an image being picked up each time in association with each other. The distortion correction value acquiring unit 5 acquires a distortion correction value by referencing the distortion correction value storage 3 based on the zoom value for image pickup at the optical system 1 which is acquired from the optical control unit 2. When there is no zoom value for image pickup stored in the distortion correction value storage 3, the distortion correction value acquiring unit 5 acquires a distortion correction value by performing an interpolation calculation.

The image correction unit 7 produces RGB signals which have the optical distortion corrected, using (i) the RGB signals for all the pixels of a plurality of lines obtained from the line memory 10 and (ii) the distortion correction value obtained from the distortion correction value acquiring unit 5. For this processing, the image correction unit 7 includes an image data control unit 8, a cache memory 9, and a distortion correction unit 11.

The image data control unit 8 receives the RGB signals from the image preprocessing unit 6 and records them in the line memory 10. The image data control unit 8 also calculates an RGB signal region of the line memory 10 required for distortion correction, reads out the region as image data for use in correction, and has it stored in the cache memory 9. Here, it is to be noted that the image data control unit 8 calculates the RGB signal region as image data for use in correction in units of fixed-size blocks. More specifically, the image data control unit 8 calculates the RGB signal region as image data for use in correction in units of blocks, each block being composed of 1/N (N being a positive integer of 2 or above) of the number of pixels on a single line in the horizontal direction and 1/M (M being a positive integer of 2 or above) of the number of lines in the vertical direction of aforementioned image data.

The distortion correction unit 11 corrects the optical distortion in the image data for use in correction read out to the cache memory 9, based on the distortion correction value acquired from the distortion correction value acquiring unit 5 via the image data control unit 8. Since the size of image data for use in correction to be read out to the cache memory 9 is fixed in the correction of optical distortion, the processing at memory access, such as memory allocation, can be reduced, and the computation cost reduced. Moreover, the size of the cache memory 9 can also be fixed, so that the manufacturing cost may also be reduced advantageously.

The image post-processing unit 12 converts the RGB signals having been distortion-corrected by the image correction unit 7, into the image signals to be recorded in the recording medium 14. The recording unit 13 has the image signals after conversion by the image post-processing unit 12 recorded in the recording medium 14. The output unit 15 reads out the image signals recorded in the recording medium 14 and outputs them to a not-shown display unit.

Figure 2A:
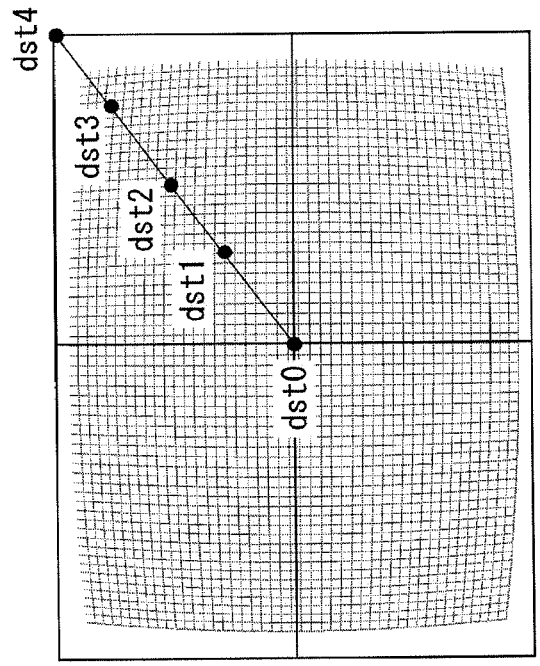
FIGS. 2A to 2C are diagrams for explaining the optical distortion of an image and its distortion rate when an image is picked up through an optical lens.
Figure 2B:
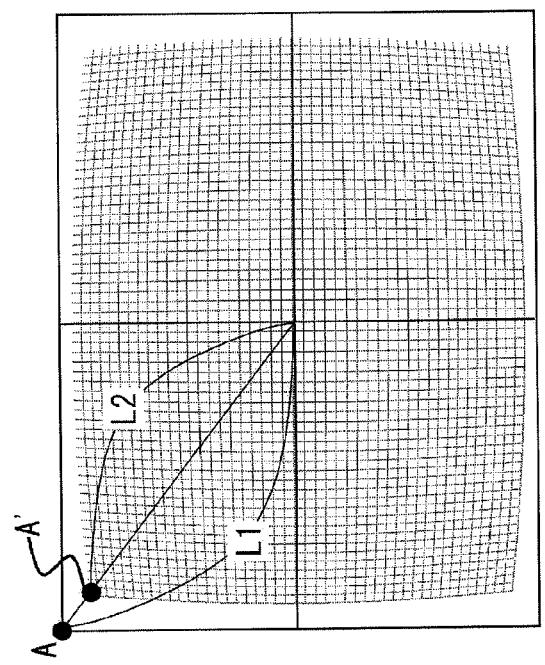
Figure 2C:
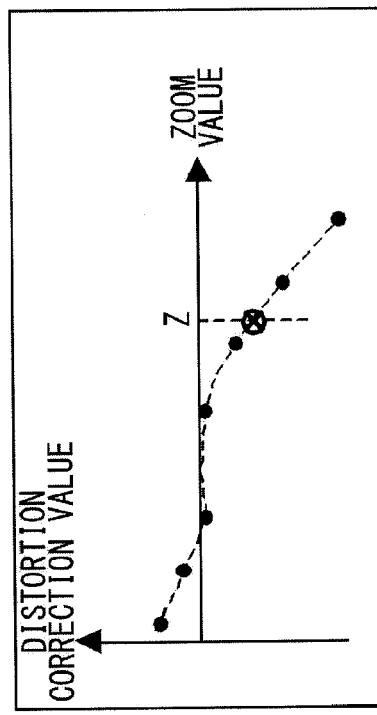

FIGS. 2A to 2C are diagrams for explaining the optical distortion of an image and its distortion rate when the image is picked up through optical lenses. Let us assume that a subject image is captured through the optical lenses and image data representing the subject image is recorded. Then a distortion occurs around the picked-up image due to a unique distortion aberration present in the optical lenses. This distortion, which is generally called an optical distortion, is classified into two types, namely, a "pin cushion" type having the corners of an image extending outward and a "barrel" type having the corners thereof contracting inward. In either case, it is generally known that the amount of distortion is determined by the distance from the optical center.

FIG. 2A is a diagram illustrating a distortion of the barrel type. In FIG. 2A, the point which must normally be imaged at point A is imaged at point A' due to a distortion. If the distances of point A and point A' from the center of the image are to be denoted by L1 and L2 respectively, the distortion rate D at the point A can be defined by the following equation, with the unit being %:

$$\text{Distortion rate [\%]} = 100 \times (L2 - L1)/L1 \tag{1}$$

It is assumed here that the center of the image is in alignment with the center axis of the optical system.

When the distortion is of a barrel type as in FIG. 2A, the distortion rate D takes a negative value. On the other hand, when the distortion is of a pin-cushion type, the distortion rate D takes a positive value. Now, solving the equation (1) for L2, Equation (2) can be obtained as follows:

$$L2 = (100 + D)/100 \times L1 \tag{2}$$

By inserting the value of the distortion rate D in Equation (2), it is possible to find where in the distorted image the pixel which must normally be present at the point A at distance L1 from the image center is present. More specifically, the distance L2, which is the distance L1 from the image center multiplied by a coefficient calculated using the distortion rate D, is the position where the pixel which must normally be present at the point A is present. Therefore, the distorted image can be corrected by performing an image processing that returns the pixel present at the position calculated by Equation (2) to the position of point A. Hence, in the following description, the distortion rate D and the distortion correction value will be used in the same sense.

FIG. 2B is a diagram for illustrating sampling points when the distortion correction values at five points of dst0 to dst4 are to be obtained for a certain fixed zoom value. FIG. 2C is a diagram schematically showing a relationship between the zoom value and the distortion correction value at the position of sampling point dst3 in FIG. 2B. The distortion correction value storage 3 stores the zoom values at respective sampling points and the distortion correction values in association with each other. As shown in FIG. 2C, a plurality of points are stored as zoom values and distortion correction values. When there is no zoom value for image pickup stored in the distortion correction value storage 3, the distortion correction value acquiring unit 5 acquires a distortion correction value by a interpolation calculation. The interpolation calculation can be accomplished by use of known spline interpolation, for instance. The number of samplings to be used in FIG. 2B and FIG. 2C is in a relation of trade-off with the accuracy and the amount of data. Therefore, it may be determined by experiment in consideration of cost and the like, but it is about 20 points, for instance.

Figure 3A:
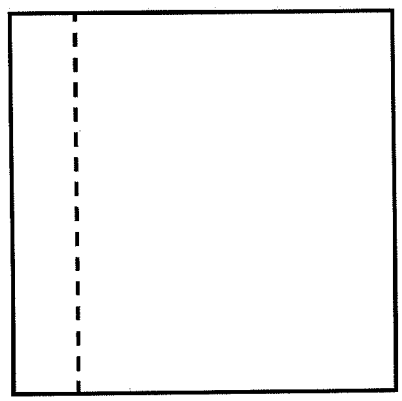
FIG. 3A to FIG. 3C are diagrams schematically showing a relationship between the degree of optical distortion and a region of image data required for correction.
Figure 3C:
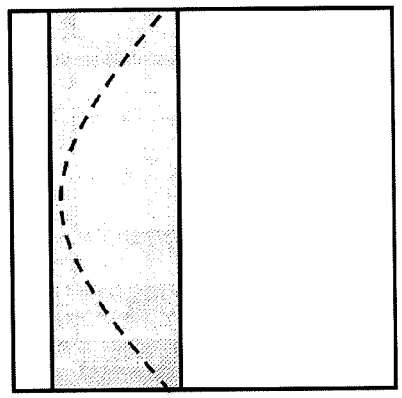
Figure 3B:
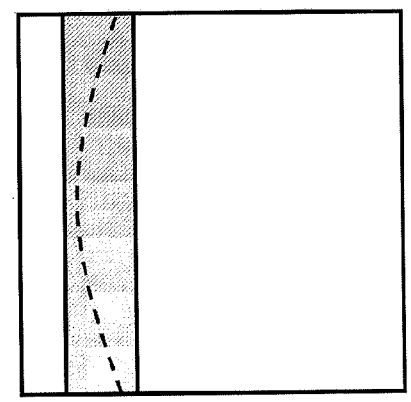

FIG. 3A to FIG. 3C are diagrams schematically showing a relationship between the degree of optical distortion and the region of image data required for correction. FIG. 3A illustrates a line in a subject whose image is to be captured. FIG. 3B and FIG. 3C show their respective examples of images having optical distortion due to the distortion aberration of their respective optical lenses used in capturing the image of the subject shown in FIG. 3A. Note that the optical distortion is greater in the example shown in FIG. 3C than one shown in FIG. 3B. The shaded regions in FIGS. 3B and 3C are the image data regions required for the correction of their respective optical distortions. As is clear from the comparison of FIG. 3B and FIG. 3C, it is generally the case that the larger the optical distortion of an image is, the larger will be the image region needed for the correction of a line in the image that has the optical distortion.

Once the lens to be contained in the optical system 1 is determined, the range of optical distortion which may be caused by the distortion aberration specific to the lens will be determined uniquely. This range for each of the lenses involved is obtained beforehand by calculation or experiment with the zoom value or the like changed. If this range is found, the maximum value (number) of the entire effective lines of the image data size necessary for the correction of optical distortion will be found also. Thus, the data size of the line memory 10 should at least be the maximum value (number) of the entire effective lines of the image data size necessary to correct the image with optical distortion produced by passage through the lenses of the optical system 1. This provides an advantage in circuit size or manufacturing cost because it does not require a memory amount (memory size) large enough to store all the pixels of image data produced by the image pickup devices 4.

Figure 4:
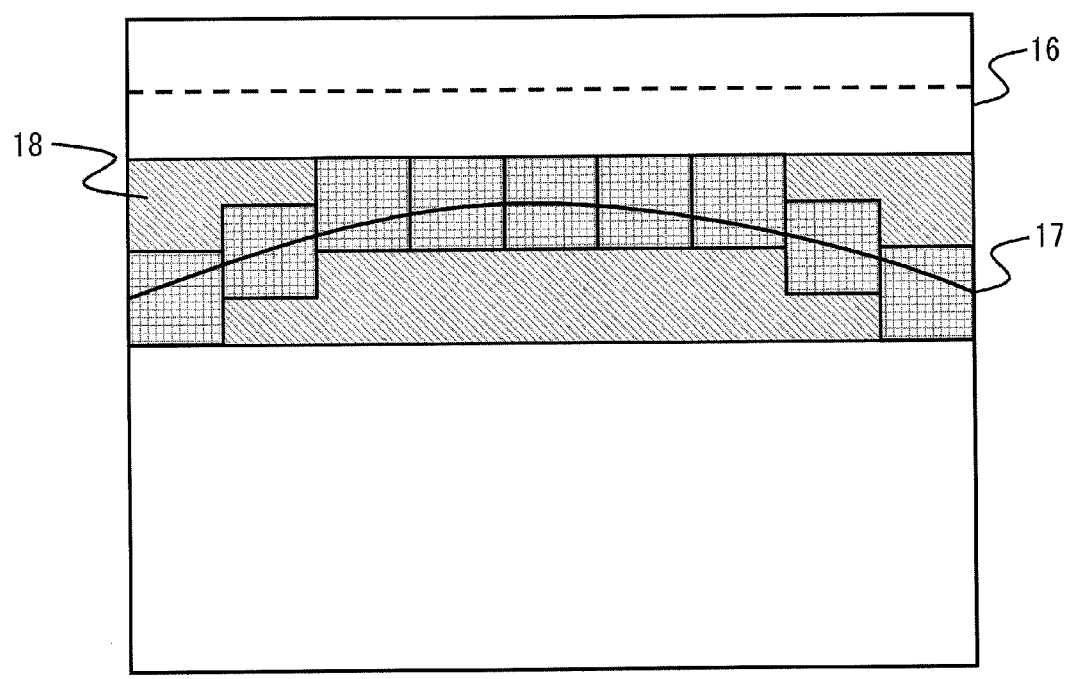
FIG. 4 is a diagram schematically showing image data of a fixed size which is read out by an image data control unit for distortion correction.

FIG. 4 is a diagram schematically showing image data of a fixed size which is read out by the image data control unit 8 for distortion correction. In FIG. 4, the broken line 16 represents a line on an image to be corrected. Also, the curved line 17 represents the positions of the pixels which must normally be present on the line shown by the broken line 16. The region indicated by oblique lines represents partial image data 18 that can be recorded by the line memory 10. The curved line 17 can be obtained by substituting the broken line 16 and the distortion rate D into the above Equation (2). Also, in FIG. 4, a plurality of lattice-patterned rectangular regions represent respectively image data of a fixed size to be read out by the image data control unit 8 for distortion correction. The respective blocks are so arranged as to contain the curved line 17.

Based on (1) the image distortion correction value for the correction of the optical distortion caused by the distortion aberration of the optical lenses contained in the optical system 1, (2) the size and shape of the above-mentioned image data for use in correction, and (3) the positions to be corrected, the image data control unit 8 determines the respective positions of the image data to be read out for use in correction, as follows. That is, the image data control unit 8 determines the respective positions thereof in such a manner that they contain the curved line 17 representing the pixels which must normally be present on the broken line 16 to be corrected, and then the image data control unit 8 reads them into the cache memory 9. The distortion correction unit 11 performs a pixel interpolation processing on the image data for use in correction read into the cache memory 9, calculates the RGB signals as the result of the distortion correction processing, and sends the RGB signals to the image post-processing unit 12. It should be understood that the pixel interpolation processing can be accomplished by use of a known interpolation processing such as spline interpolation or linear interpolation.

Figure 5A:
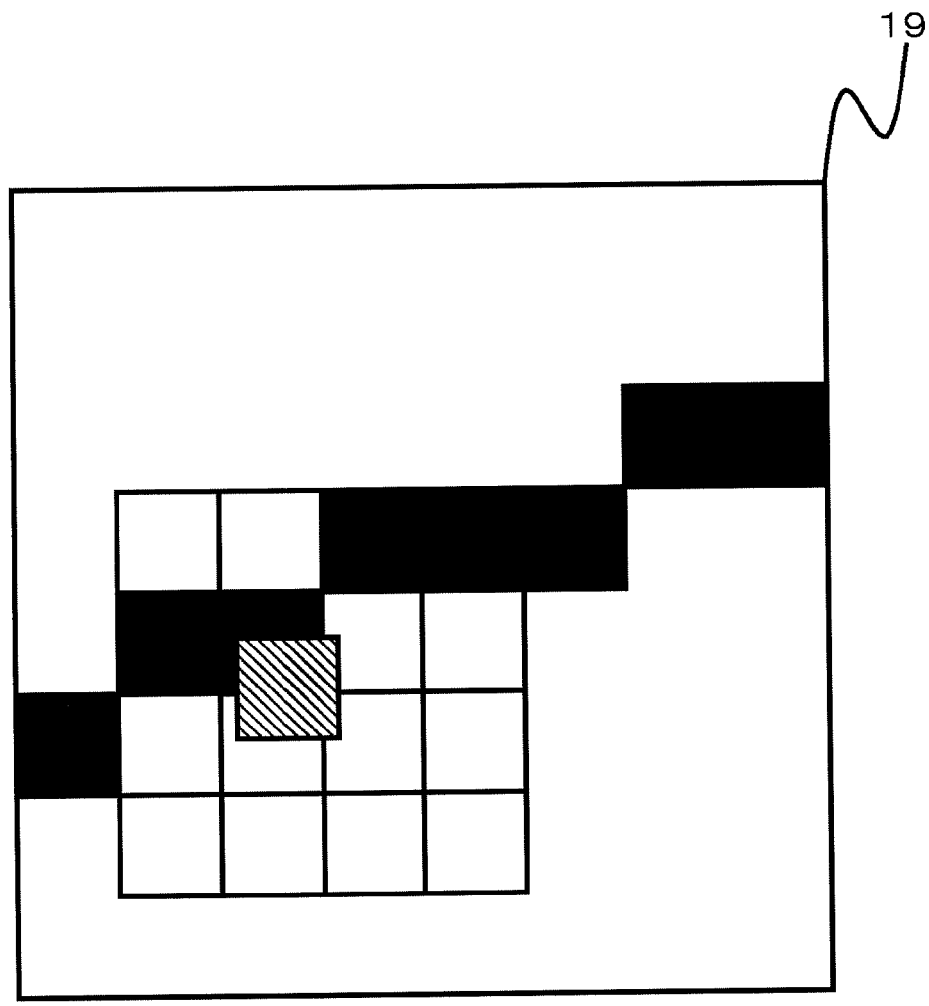
FIG. 5A and FIG. 5B are diagrams for explaining a pixel interpolation by a distortion correction unit.
Figure 5B:
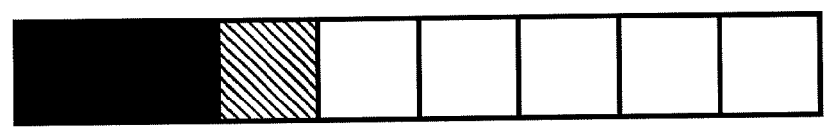

FIG. 5A and FIG. 5B are diagrams for explaining the pixel interpolation by the distortion correction unit 11. FIG. 5A is a diagram showing an example of image data for use in correction 19 read into the cache memory 9. In FIG. 5A, the blacked-out pixels show how straight lines are distorted by the optical distortion. FIG. 5B is a diagram showing a line to be correction-processed by the distortion correction unit 11. The distortion correction unit 11 determines the pixels constituting the line to be correction-processed sequentially. In FIG. 5B, the blacked-out pixels represent the pixels for which the correction has been finished, and the pixel with oblique lines is one for which the distortion correction unit 11 is now performing a correction calculation.

The distortion correction unit 11 calculates which position in the image data for use in correction 19 read into the cache memory 9, as shown in FIG. 5A, the pixel to be correction-calculated as shown in FIG. 5B resides in, using the above Equation (2). If the position matches any specific pixel of the image shown in FIG. 5A as a result of the calculation, the distortion correction unit 11 will acquire the value of the pixel as the pixel after correction. However, it is to be noted that the position calculated using Equation (2) does not necessarily coincide with any specific pixel of the image shown in FIG. 5A. For example, the pixel with oblique lines in FIG. 5A is in the position where the pixel with oblique lines in FIG. 5B, which has been calculated using Equation (2), resides, and the position does not coincide with any specific pixel of the image shown in FIG. 5A.

When the position calculated using Equation (2) does not exactly coincide with any specific pixel of the image shown in FIG. 5A, the distortion correction unit 11 performs an interpolation calculation to obtain the value of the pixel at the position calculated using Equation (2). As shown in FIG. 5A, the distortion correction unit 11 obtains a pixel value for use in correction by performing spline interpolation, using the pixel values in the peripheral region of the position calculated using Equation (2) (e.g., a region composed of four vertical pixels×four horizontal pixels).

FIGS. 6A to 6C are diagrams for explaining a termination processing in pixel interpolation by the distortion correction unit 11. FIG. 6A shows the position where the pixel to be corrected, as calculated by the distortion correction unit 11 using Equation (2), is present. Similar to FIG. 5, the pixel with oblique lines is the pixel to be corrected. Shown here is an example in which the pixel resides outside the image data for use in correction 19 read into the cache memory 9, as a result of calculation using Equation (2). In this case, there must normally be a region containing the peripheral region for interpolation as image data for use in correction, such as image data for use in correction 19' shown in FIG. 6B. In reality, however, such a region cannot be made available due to the limitation of the capacity of the line memory 10.

Thus, when the peripheral region for interpolation, such as region 21 of FIG. 6C, is not present within the same cache memory 9, a check is made to ascertain if the desired peripheral region for interpolation is in another of a plurality of cache memories 9, and the one there, if it resides in the cache memory 9, will be utilized. Or if there is no peripheral region for interpolation within the cache memories 9, then a signal 20 within the cache memory 9 will be used as a substitute.

Figure 7A:
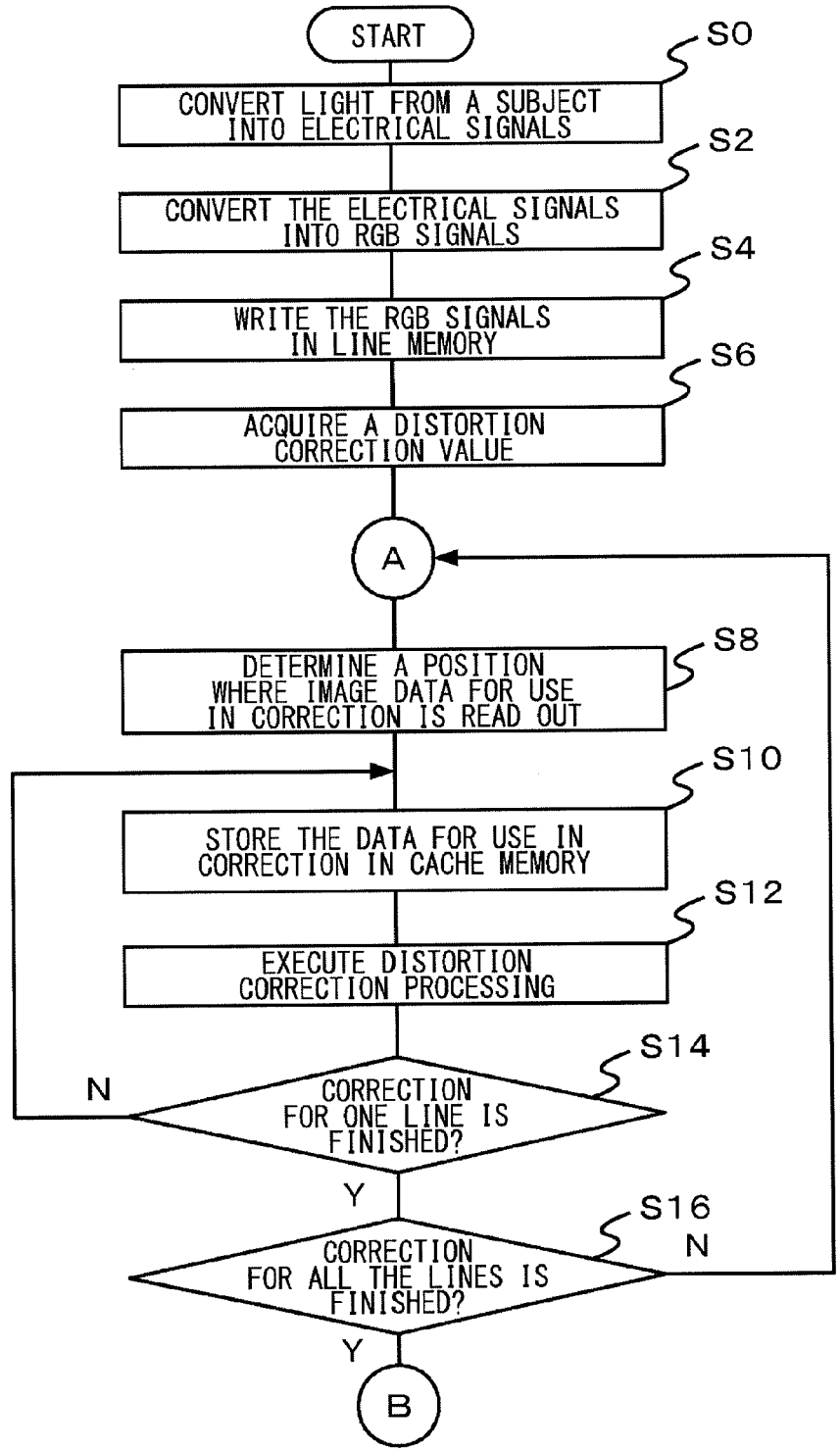
FIG. 7A is the first half of a flowchart for explaining a flow of processings by an image correction apparatus according to a first embodiment.

FIG. 7A is the first half of a flowchart for explaining the flow of processings by the image correction apparatus 100 according to the first embodiment.

The image pickup devices 4 convert optical signals emitted from a subject and focused by an optical system 1 subjected to zoom value control from the optical control unit 2 into electrical signals (S0). The image preprocessing unit 6 converts the electrical signals converted by the image pickup devices 4 into RGB signals (S2). Here, the RGB signals are sequentially outputted to the image correction unit 7 line by line from the left above start to the right below end. At this stage, there is optical distortion occurring in the image data because the process of correcting the optical distortion has not been done yet.

The image data control unit 8 of the image correction unit 7 sends the RGB signals acquired from the image preprocessing unit 6 sequentially and writes them in the line memory 10 (S4). In order to minimize the number of lines of the line memory, the image data control unit 8, when the line memory 10 is full, records a new line by successively deleting the uppermost line, which is the oldest-recorded line.

The distortion correction value acquiring unit 5 references a plurality of sample values for the zoom value stored in the distortion correction value storage 3, and extracts a sample value, which is the same as or closest to the zoom value in image capturing at the optical control unit 2, and a distortion correction value corresponding to the sample value. Thereby, the distortion correction value acquiring unit 5 calculates an actual distortion correction value by carrying out an interpolation calculation applicable to the difference between the zoom value at image capturing and the sample value (S6). The image data control unit 8 of the image correction unit 7 calculates horizontal pixel positions and vertical lines necessary for a line of distortion correction processing, based on the distortion correction value for the zoom value in image capturing calculated by the distortion correction value acquiring unit 5. Thereby, the image data control unit 8 determines a region of the image data for use in correction to be read out from all the pixel RGB signals for a plurality of lines recorded in the line memory 10, in units of blocks, each block being composed of 8 pixels in the horizontal direction and 8 lines in the vertical direction (S8).

Based on the result of Step S8, the image data control unit 8 of the image correction unit 7 reads out the image data for use in correction in units of blocks, each block being composed of 8 pixels in the horizontal direction and 8 lines in the vertical direction, and has the read-out image data stored in one of a plurality of cache memories 9 (S10). The distortion correction unit 11 of the image correction unit 7 performs a pixel interpolation by extracting RGB signals of the horizontal pixel positions and vertical lines and RGB signals of their peripheral pixel positions and line positions, which are stored in the cache memory 9 and needed for distortion correction processing, and thereby calculates the RGB signal as the result of distortion correction processing at each pixel position (S12).

If the correction processing for a line is not finished (N of S14), the procedure will return to Step S10 and the correction processing for a line will be continued. Note that when all of the cache memories 9 are full, the RGB signals in the earliest cache memory 9 are discarded to store new RGB signals. If the correction processing for a line is finished (Y of S14) and yet the correction for all the lines is not finished (N of S16), the procedure will return to Step S8 and the correction processing for the next line will be started. On completion of the correction of all the lines (Y of S16), the procedure of this flowchart shown in FIG. 7A comes to an end.

Figure 7B:
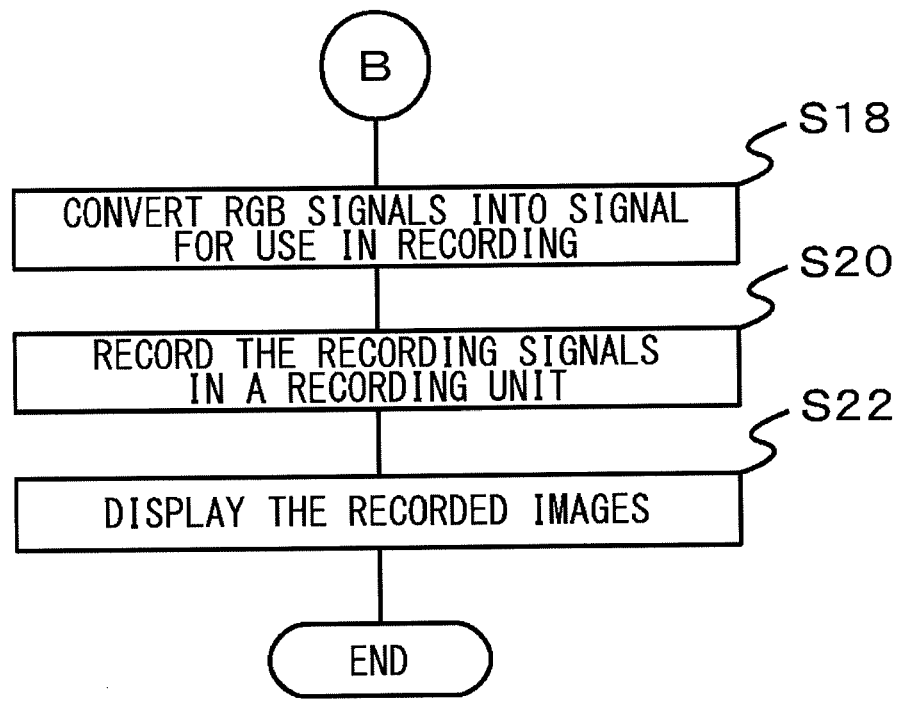
FIG. 7B is the latter half of a flowchart for explaining a flow of processings by an image correction apparatus according to a first embodiment.

FIG. 7B is the latter half of a flowchart for explaining the flow of processings by the image correction apparatus 100 according to the first embodiment.

The image post-processing unit 12 performs signal conversions, such as conversion of signal specifications or compression, for the recording of corrected RGB signals in the recording medium 14 (S18). The recording unit 13 records the image signals acquired from the image post-processing unit 12 in the recording medium 14 (S20). The output unit 15 displays the image signals recorded in the recording medium 14 according to the specifications for display by a not-shown display unit (S22).

An operation implementing the above-described structure is as follows. As a user takes an image using the image correction apparatus 100 according to the first embodiment, the distortion correction value acquiring unit 5 obtains an actual distortion correction value by an interpolation calculation based on (i) the zoom value in image capturing, (ii) the sample value for the zoom value acquired from the distortion correction value storage 3, and (iii) the distortion correction value corresponding to the sample value. Based on the distortion correction value, the image data control unit 8 determines image data for use in correction of a fixed size, which is necessary for the correction of optical distortion. Thus, the present embodiment uses the region of a fixed size for the correction of optical distortion, thereby minimizing the capacities of line memory and cache memory registers that must be prepared for storing the region of image data.

As explained above, the image correction apparatus 100 according to the first embodiment can realize a function of correcting the optical distortion while reducing the number of lines of line memory and the size of cache memory register.

Second Embodiment

A second embodiment of the present invention will be outlined below. Prior to correcting the optical distortion of image data picked up through the lenses using the image interpolation technique, an image correction apparatus 101 according to a second embodiment calculates to obtain the maximum amount of data necessary for the correction of optical distortion caused by the lenses and then conveys the maximum data amount together with the amount of memory provided with the image correction apparatus 101. Note that hereinafter the description of the structural components identical or equivalent to those of the image correction apparatus 100 according to the first embodiment will be omitted or simplified as appropriate.

Figure 8:
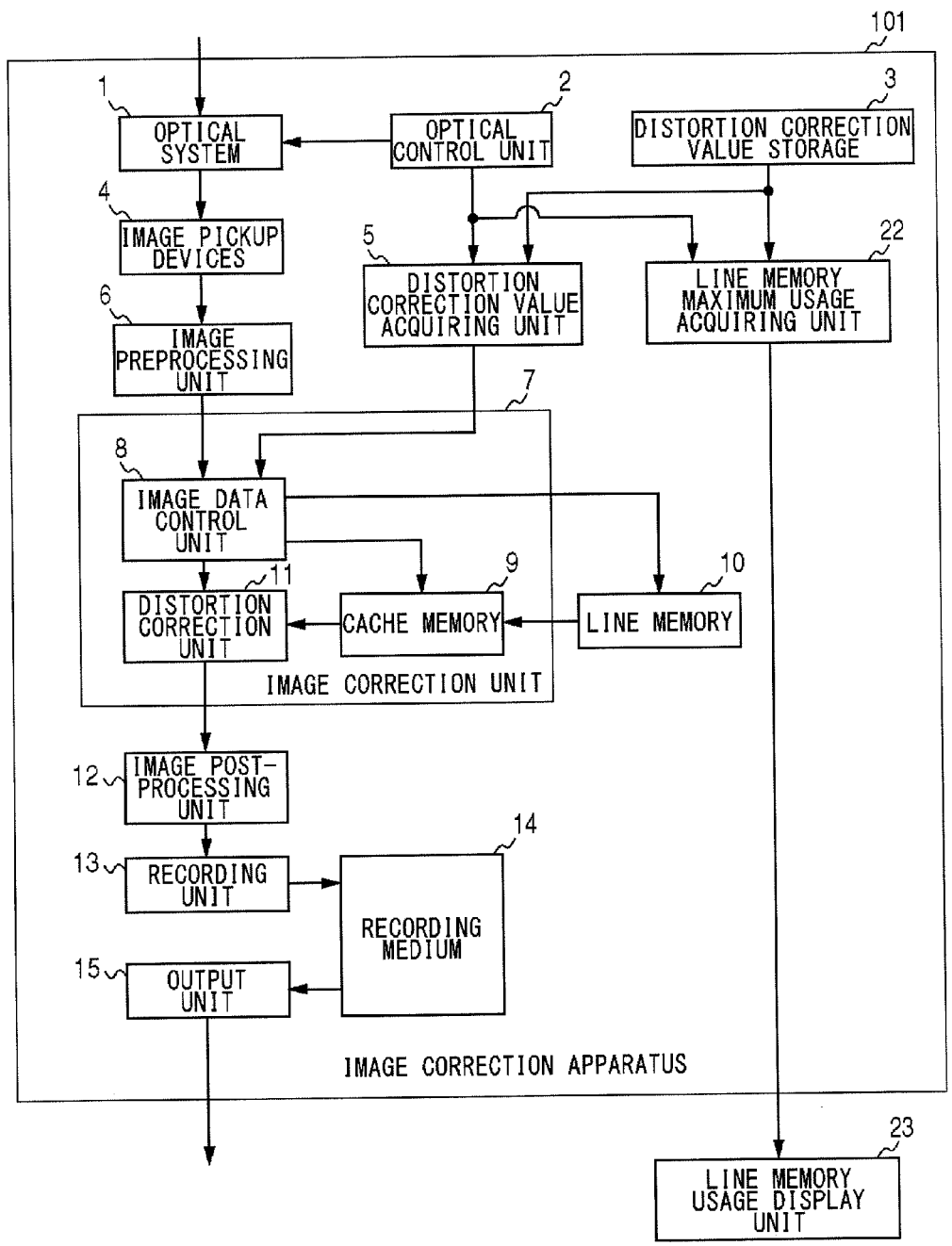
FIG. 8 is a schematic diagram showing an internal structure of an image correction apparatus according to a second embodiment.

FIG. 8 is a schematic diagram showing an internal structure of an image correction apparatus 101 according to the second embodiment. The image correction apparatus 101 includes an optical system 1, an optical control unit 2, a distortion correction value storage 3, image pickup devices 4, a distortion correction value acquiring unit 5, a line memory maximum usage acquiring unit 22, an image preprocessing unit 6, an image correction unit 7, a line memory 10, an image postprocessing unit 12, a recording unit 13, a recording medium 14, an output unit 15, and a line memory usage display unit 23.

In the image correction apparatus 101, the optical system 1, which acquires optical information from a subject as a focused image, includes a plurality of lenses such as zoom lenses. These lenses are replaceable. The line memory maximum usage acquiring unit 22 calculates the maximum used amount of line memory required for the process of correcting the distortion in the zoom value for image pickup at the optical system 1. More specifically, the line memory maximum usage acquiring unit 22 calculates the amounts of line memory required for the correction in all the zoom values assumed by the optical lenses, acquires the thus calculated amounts thereof, and outputs its maximum value as a maximum used amount of line memory. The line memory usage display unit 23 displays the maximum used amount of line memory, required for the process of correcting the distortion, which has been acquired from the line memory maximum usage acquiring unit 22.

If the acquired maximum used amount of line memory is larger than the capacity of the line memory 10, the line memory maximum usage acquiring unit 22 will add a signal indicating the shortage of memory and transmit this signal to the line memory usage display unit 23. This is because the proper process of correcting the optical distortion cannot be performed when memory required for the correction of optical distortion is insufficient. The user can confirm whether the maximum used amount of line memory required for the process of correcting the distortion exceeds the capacity of memory provided in image correcting apparatus 101 or not, that is, the user can check if the proper correction processing can be performed or not. Thus, the lens or lenses in the optical system 1 may be changed to a lens or lenses, having the distortion aberration, with which the distortion correction processing can be accurately performed.

Figure 9:
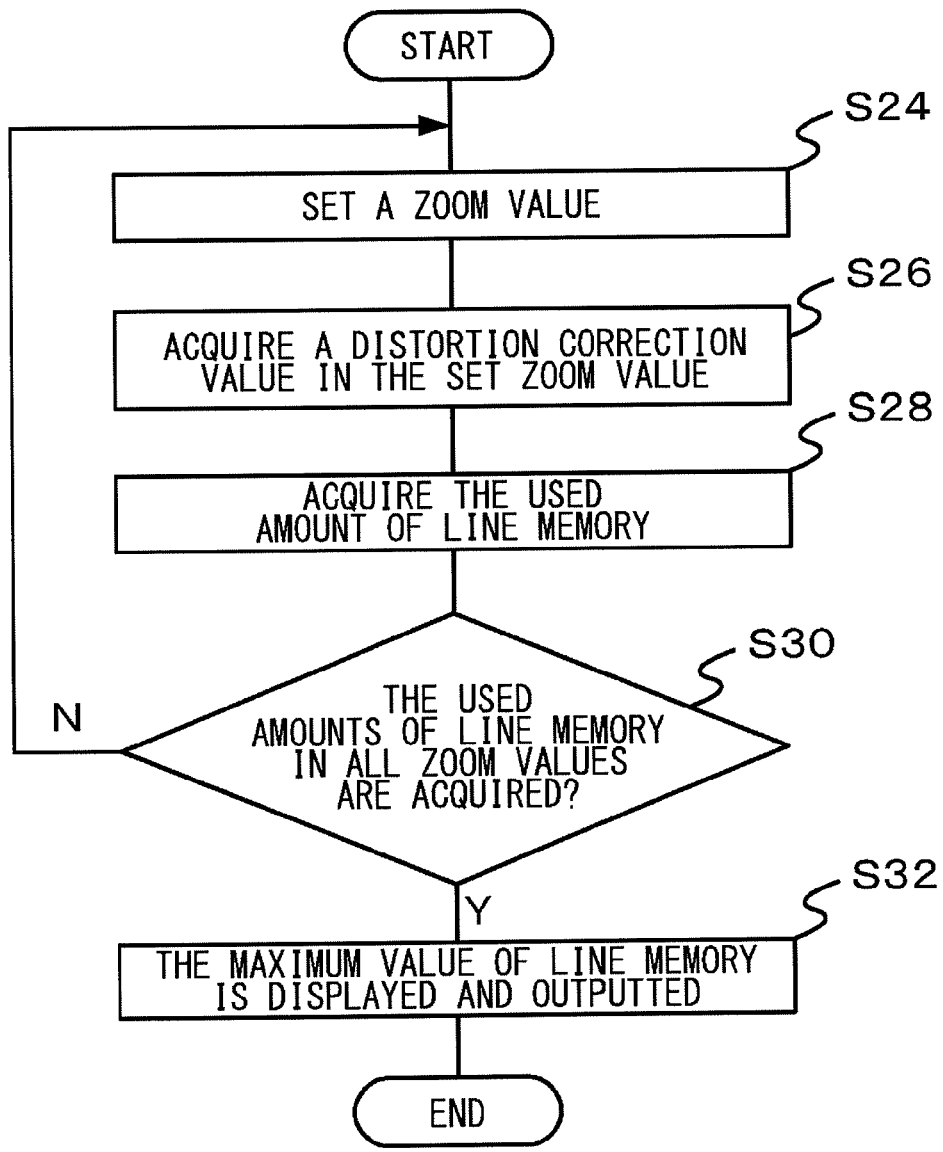
FIG. 9 is a flowchart for explaining a flow of processings by a line memory maximum usage acquiring unit according to a second embodiment.

FIG. 9 is a flowchart for explaining a flow of processings by the line memory maximum usage acquiring unit 22 according to the second embodiment.

The line memory maximum usage acquiring unit 22 acquires the type of the lenses used in the optical system 1, and sets a zoom value in a range of zoom values attainable by the lenses (S24). Based on the type of the lenses used in the optical system 1 and the zoom value set, the line memory maximum usage acquiring unit 22 acquires a distortion correction value from the distortion correction value storage 3 (S26). The sample values of zoom values and distortion correction values are stored in association with each other according to the type of the lenses. Thus, if the zoom value set thereby is not stored, the line memory maximum usage acquiring unit 22 will acquire the distortion correction by an interpolation calculation.

Subsequently, based on the thus acquired distortion correction value, the line memory maximum usage acquiring unit 22 calculates and acquires the number of lines in use for the line memory required for the correction of optical distortion occurring at the set zoom value used in the optical system 1 (S28). If the number of lines in use for the line memory required for the correction of the optical distortion is calculated and acquired for all the zoom values assumed by the optical lenses used in the optical system 1 (Y of S30), the line memory usage display unit 23 will acquire and display the maximum value of the number of lines in use for the line memory required for the correction of optical distortion occurring in the lenses used in the optical system 1 (S32).

If all the zoom values assumed by the optical lenses used in the optical system 1 is not set (N of S30), the line memory maximum usage acquiring unit 22 will return to Step S24 and continue to set new zoom values so as to continue to calculate the used amount of line memory. Once the line memory usage display unit 23 displays the maximum value of the number of lines in use for the line memory required for the correction of optical distortion, the processing comes to an end.

As described above, the image correction apparatus 101 according to the second embodiment can realize a function of correcting the optical distortion while reducing the number of lines of line memory and the size of cache memory register. Moreover, any of the optical lenses whose distortion level exceeds the memory size, mounted on the image correction apparatus 101, used for the distortion correction processing is/are determined and notified accordingly. Thus, the user can change such optical lens or lenses exceeding the memory size to a distortion aberration lens or lenses capable of accurately carrying out the distortion correction processing.

Third Embodiment

A third embodiment of the present invention will be outlined below. When the maximum amount of data required for the correction of optical distortion of image data picked up through the optical lenses exceeds the maximum number of vertical lines usable by the line memory, an image correction apparatus according to the third embodiment adjusts the optical distortion correction values such that the maximum amount thereof lies within the range where the line memory can be utilized. Then, based on the thus adjusted optical distortion correction values, the image correction apparatus corrects the optical distortion. Note that hereinafter the description of the structural components identical or equivalent to those of the image correction apparatus 100 according to the first embodiment or the image correction apparatus 101 according to the second embodiment will be omitted or simplified as appropriate.

Figure 10:
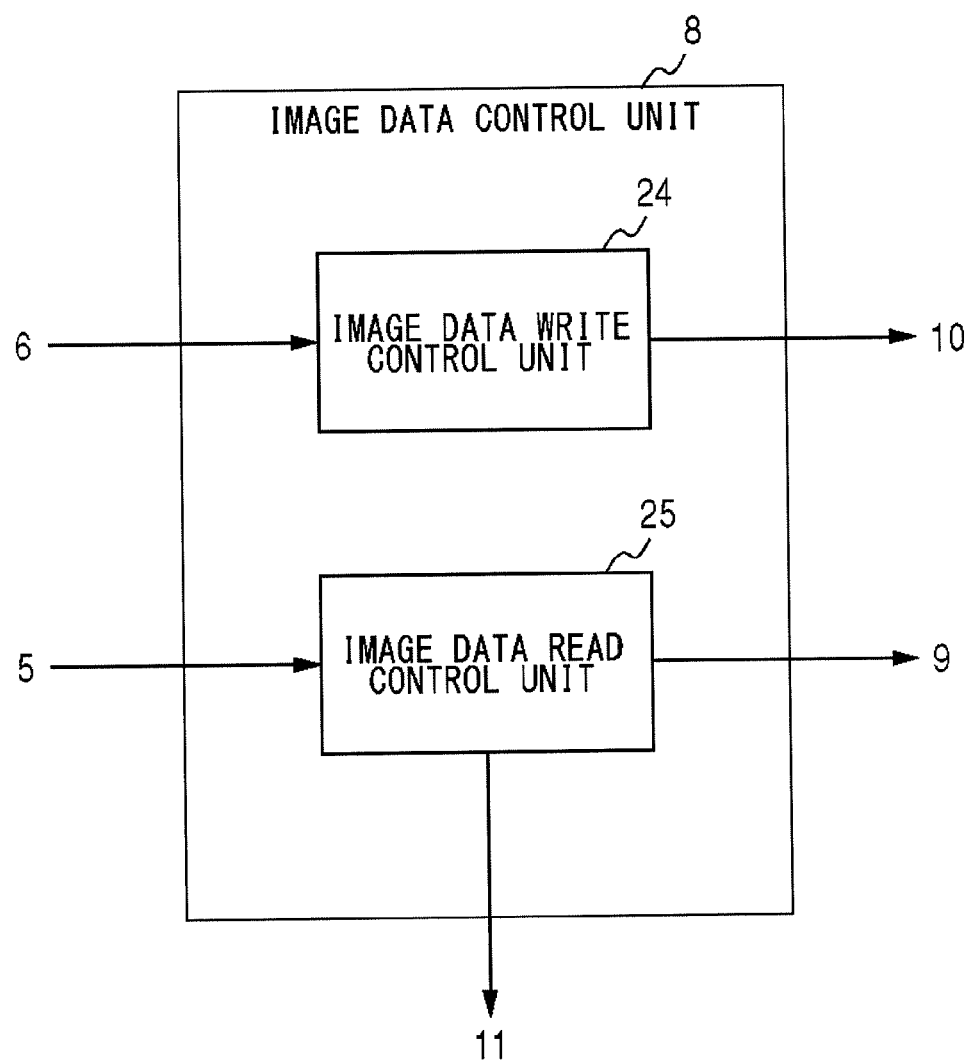
FIG. 10 is a schematic diagram showing an internal structure of an image data control unit according to a third embodiment.

FIG. 10 is a schematic diagram showing an internal structure of an image data control unit 8 according to the third embodiment. The image data control unit 8 according to the third embodiment includes an image data write control unit 24 and an image data read control unit 25.

The image data write control unit 24 sends the RGB signals acquired from the image preprocessing unit 6 sequentially and writes them in the line memory 10. In order to minimize the number of lines of the line memory, the image data write control unit 24, when the line memory 10 is full, records a new line by successively deleting the uppermost line. The image data read control unit 25 calculates and acquires the number of vertical lines necessary for a line of distortion correction processing, from the distortion correction value for the zoom value in image capturing acquired by the distortion correction value acquiring unit 5. At this time, if the number of vertical lines exceeds the maximum number of lines of the line memory, the image data read control unit 25 will change the distortion correction value to a value correctable by the maximum number of lines of the line memory.

Figure 11B:
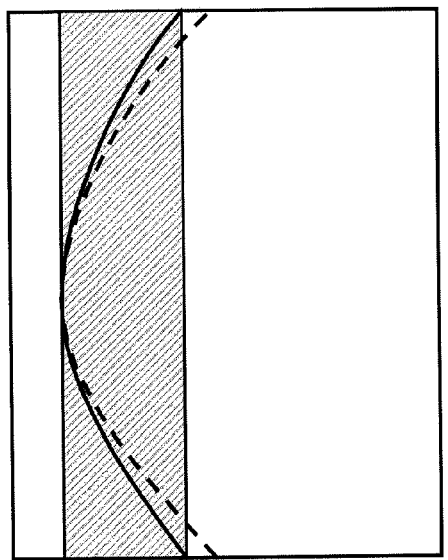
FIGS. 11A to 11D are diagrams for explaining a relationship between optical distortion and the number of vertical lines required for the correction of the optical distortion.
Figure 11D:
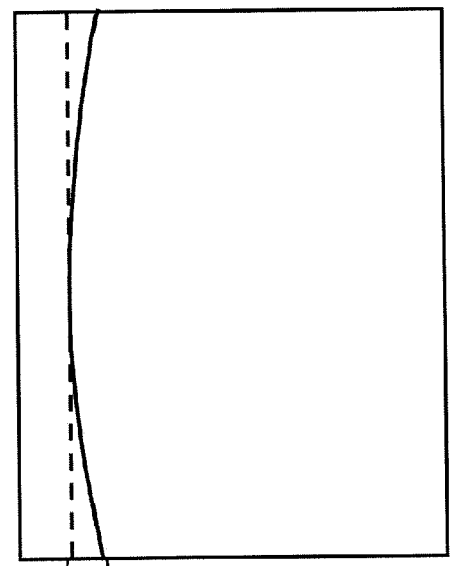
Figure 11A:
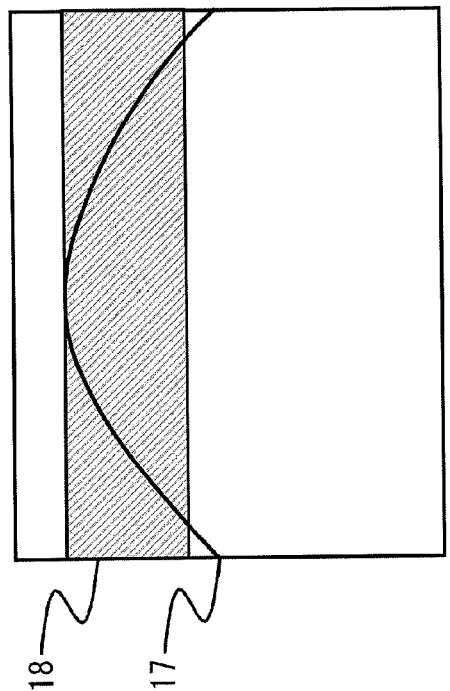

FIGS. 11A to 11D are diagrams for explaining a relationship between optical distortion and the number of vertical lines required for the correction of the optical distortion. In FIG. 11A, the curved line 17 represents a position referenced by the distortion correction unit 11 to correct the optical distortion of a line. Here, the curved line 17 can be calculated using the above-described Equation (2). The curved line 17 exists exceeding the partial image data 18 storable in the line memory 10. Thus, the optical distortion present in circular areas 26 shown in FIG. 11A cannot be corrected. This is because no image data necessary for the interpolation is available.

Thus, the image data read control unit 25 calculates and acquires the distortion correction value for optical distortion which is correctable when the partial image data 18 storable in the line memory 10 is maximally used. A curved line 17' in FIG. 11B represents a position referenced by the distortion correction unit 11 relative to a correctable optical distortion calculated by the image data read control unit 25. The size of the partial image data 18 storable in the line memory 10 is fixed, so that the image data read control unit 25 can set the curved line 17' which can be referenced by the distortion correction unit 11 within a certain range containing the fixed size thereof. If the curved line 17' can be set, L2 in Equation (1) can be found. Since a line to be corrected is predetermined, L1 in Equation (1) can also be found. Thus, using Equation (1), the image data read control unit 25 can calculate the distortion correction value for optical distortion which is correctable when the partial image data 18 storable in the line memory 10 is maximally used.

Figure 11C:
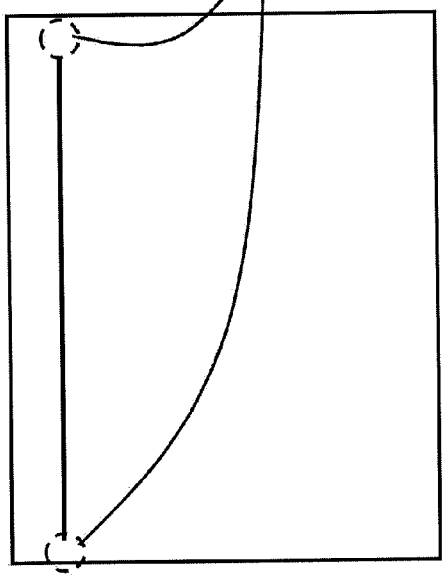

A curved line 27 shown in FIG. 11D shows a result of correction done by the distortion correction unit 11 based on the distortion correction value for optical distortion which is correctable when the partial image data 18 storable in the line memory 10 is maximally used. A curved line 27' in FIG. 11D shows a correction result which must otherwise be obtained after the correction based on the correction value. As shown in FIG. 11D, the image which must normally be corrected as a straight line remains curved because of an insufficient correction. At the same time, such areas as shown in FIG. 11C which cannot be corrected do not exist in FIG. 11D, and an image where the optical distortion has been somehow corrected in comparison with FIG. 11B is obtained in FIG. 11D.

As evident from Equation (2), the smaller the distortion rate D becomes, the longer the distance L2 between the position referenced by the distortion correction unit 11 to correct the optical distortion and the center of the image becomes. As a result, the partial image data 18 becomes smaller. Thus, a correction amount (0<N<1) of correction value, which is a positive real number less than 1, is multiplied by the distortion rate D acquired from the distortion correction value acquiring unit 5, thereby adjusting the distortion correction value.

Figure 12:
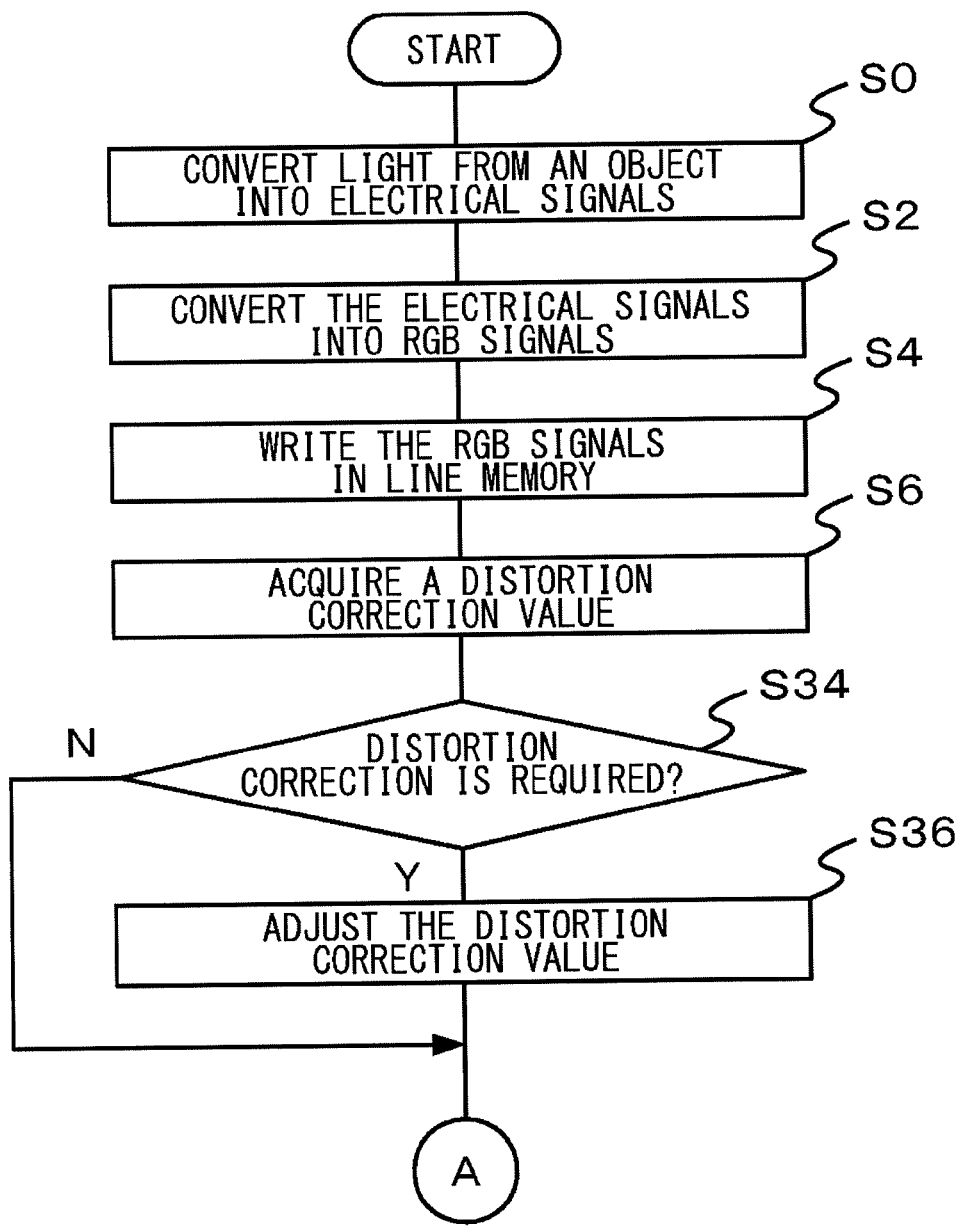
FIG. 12 is a flowchart for explaining a flow of processings by an image correction apparatus according to a third embodiment.

FIG. 12 is a flowchart for explaining a flow of processings by the image correction apparatus according to the third embodiment.

The image pickup devices 4 convert optical signals emitted from a subject and focused by an optical system 1 subjected to zoom value control from the optical control unit 2 into electrical signals (S0). The image preprocessing unit 6 converts the electrical signals converted by the image pickup devices 4 into RGB signals (S2). The image data write control unit 24 in the image data control unit 8 sends the RGB signals acquired from the image preprocessing unit 6 sequentially and writes them in the line memory 10 (S4). The distortion correction value acquiring unit 5 references a plurality of sample values for the zoom value stored in the distortion correction value storage 3, and extracts a sample value, which is the same as or closest to the zoom value in image capturing at the optical control unit 2, and a distortion correction value corresponding to the sample value. Thereby, the distortion correction value acquiring unit 5 calculates an actual distortion correction value by carrying out an interpolation calculation applicable to the difference between the zoom value at image capturing and the sample value (S6).

The image data read control unit 25 determines if the distortion correction value acquired from the distortion correction value acquiring unit 5 needs to be adjusted or not; if the adjustment is necessary (Y of S34), the distortion correction value will be adjusted to a value which can be corrected by the maximum number of lines recordable by the line memory 10 (S36). If no adjustment of the distortion correction value is necessary (N of S34), the image data read control unit 25 will not adjust the distortion correction value. The processings subsequent to Step S36 are similar to those subsequent to Step S8 of FIG. 7A.

As described above, the image correction apparatus according to the third embodiment can realize a function of correcting the optical distortion while keeping the number of lines of the line memory and/or the size of cache memory register to a constant value.

Fourth Embodiment

A fourth embodiment of the present invention will be outlined below. According to an image correction apparatus 103 of the fourth embodiment, (i) a work area used to correct the optical distortion of image data picked up through the optical lenses and (ii) a work area used to perform an additional image processing on the image data whose optical dictation has been corrected share a common area. And the image correction apparatus 103 changes the data amount of work area usable in the correction processing of optical distortion according to the priority level between the correction processing of optical distortion and the additional image processing. Note that hereinafter the description of the structural components identical or equivalent to those of the image correction apparatus 100 according to the first embodiment, the image correction apparatus 101 according to the second embodiment or the image correction apparatus according to the third embodiment will be omitted or simplified as appropriate.

Figure 13:
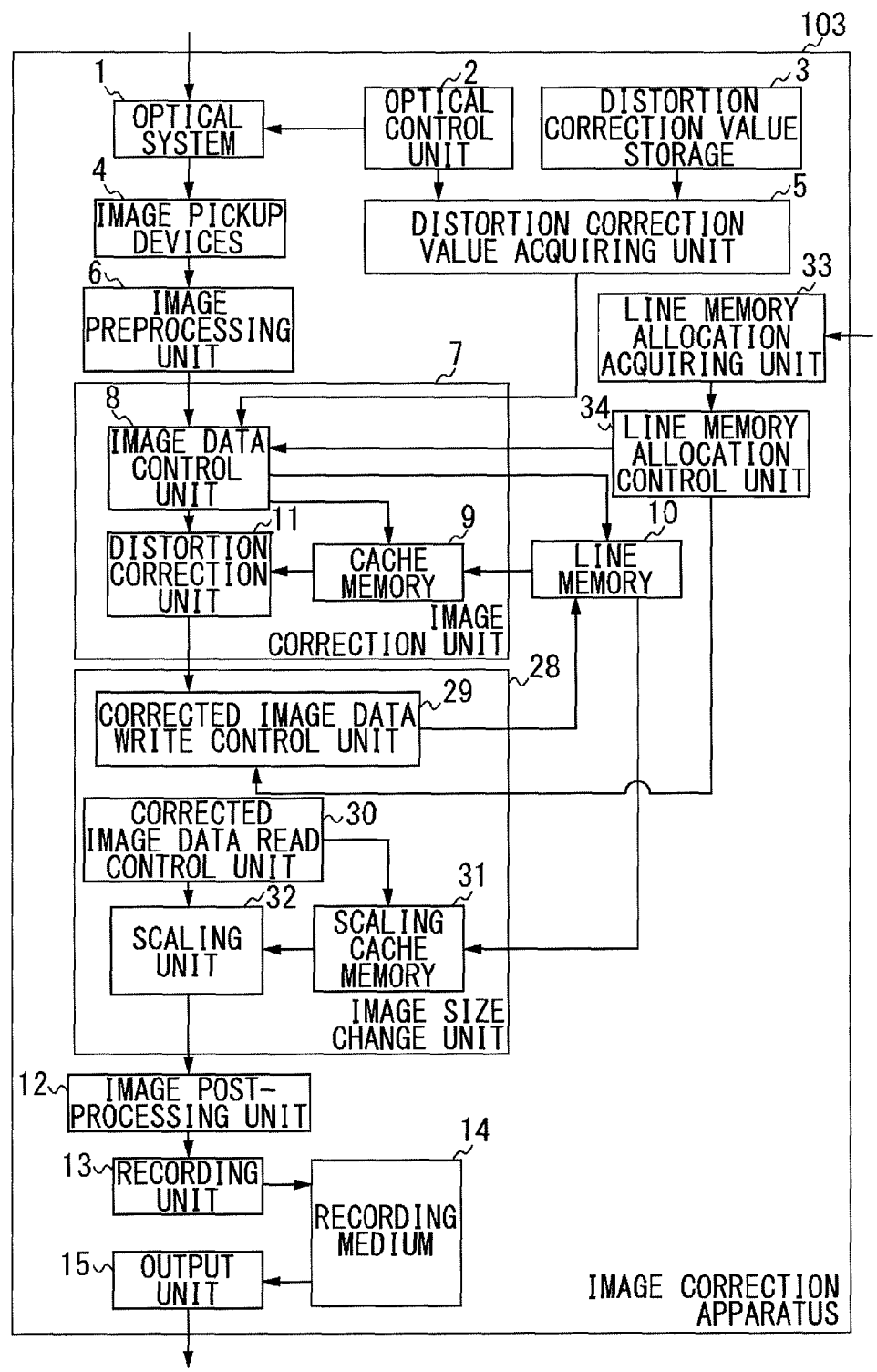
FIG. 13 is a schematic diagram showing an internal structure of an image correction apparatus according to a fourth embodiment.

FIG. 13 is a schematic diagram showing an internal structure of the image correction apparatus 103 according to the fourth embodiment. As compared with the image correction apparatus according to first embodiment, the image correction apparatus 103 according to the fourth embodiment further includes an image size change unit 28, a memory allocation acquiring unit 33, and a memory allocation control unit 34.

The image size change unit 28 performs expansion/compression processing on the image data corrected by the distortion correction unit 11. For this purpose, the image size change unit 28 includes a corrected image data write control unit 29, a corrected image data read control unit 30, a scaling cache memory 31 and a scaling unit 32.

The corrected image data write control unit 29 writes the corrected image data acquired from the distortion correction unit 11, into an area of the line memory 10 assigned for the corrected image data write control unit 29. The corrected image data read control unit 30 reads out the image data, for use in expansion/compression processing, required for the change of the image size from the line memory 10 sequentially so as to store them in the scaling cache memory 31. The scaling unit 32 expands or compresses the scaling image data read out from the scaling cache memory 31. In this manner, the image size change unit 28 can change the size of the image data corrected by the distortion correction unit 11, as a single piece of image data.

Note here that the image correction unit 7 and the image size change unit 28 share the line memory 10 as their work areas. As described earlier, the larger the optical distortion present in the image data is, the larger the number of vertical lines, of the line memory 10, required for the correction of the optical distortion will be. On the other hand, as the scaling factor in changing the image size is further away from "1", the number of vertical lines of the line memory 10 required for the change of the size becomes larger. For example, as the image size becomes smaller due to the compression, the number of vertical lines of the line memory 10 required for the processing becomes larger. Thus, the degree of correctable optical distortion is in a relation of trade-off with the degree of variation in the size of image data.

Hence, the memory allocation control unit 34 changes the maximum number of lines of the line memory 10 usable by the distortion correction unit 11, according to the priority level between the optical correction processing performed by the distortion correction unit 11 and the expansion/compression processing performed by the image size change unit 28. More specifically, the memory allocation control unit 34 sorts the number of vertical lines recordable by the line memory 10 into the number of lines usable by the image data control unit 8 and the number of lines usable by the corrected image data write control unit 29. The maximum number of vertical lines of partial image data in the line memory 10 usable by the distortion correction unit 11 is acquired by the memory allocation acquiring unit 33 from the user with priority given to the optical distortion correction processing.

Figure 14A:
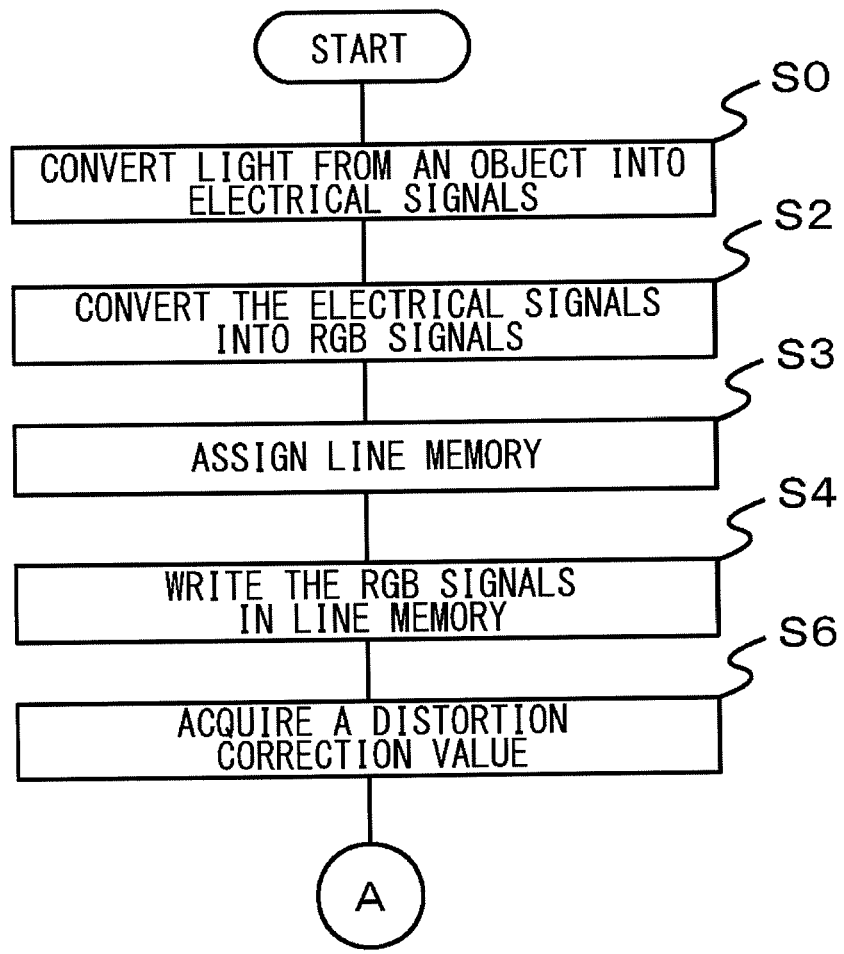
FIG. 14A is the first half of a flowchart for explaining a flow of processings by an image correction apparatus according to a fourth embodiment.

FIG. 14A is the first half of a flowchart for explaining a flow of processings by the image correction apparatus 104 according to the fourth embodiment.

The image pickup devices 4 convert optical signals emitted from a subject and focused by an optical system 1 subjected to zoom value control from the optical control unit 2 into electrical signals (S0). The image preprocessing unit 6 converts the electrical signals converted by the image pickup devices 4 into RGB signals (S2). The memory allocation control unit 34 allocates a usage area of the line memory 10, based on the maximum number of vertical lines of partial image data in the line memory 10, acquired from the memory allocation acquiring unit 33, which is usable by the distortion correction unit 11 (S3).

The image data control unit 8 of the image correction unit 7 sends the RGB signals acquired from the image preprocessing unit 6 sequentially and writes them in the line memory 10 (S4). In order to minimize the number of lines of the line memory, the image data control unit 8, when the line memory 10 is full, records a new line by successively deleting the uppermost line, which is the oldest-recorded line.

The distortion correction value acquiring unit 5 extracts a plurality of sample values for the zoom value stored in the distortion correction value storage 3 and the distortion correction values corresponding respectively to the sample values. Also, the distortion correction value acquiring unit 5 calculates an actual distortion correction value by carrying out an interpolation calculation applicable to the difference between the zoom value at image capturing and the sample value (S6). The processes from Step S8 to Step S16 in FIG. 7A are carried out similarly to the processes carried out by the image correction apparatus 100 of the first embodiment shown in FIG. 7A.

Figure 14B:
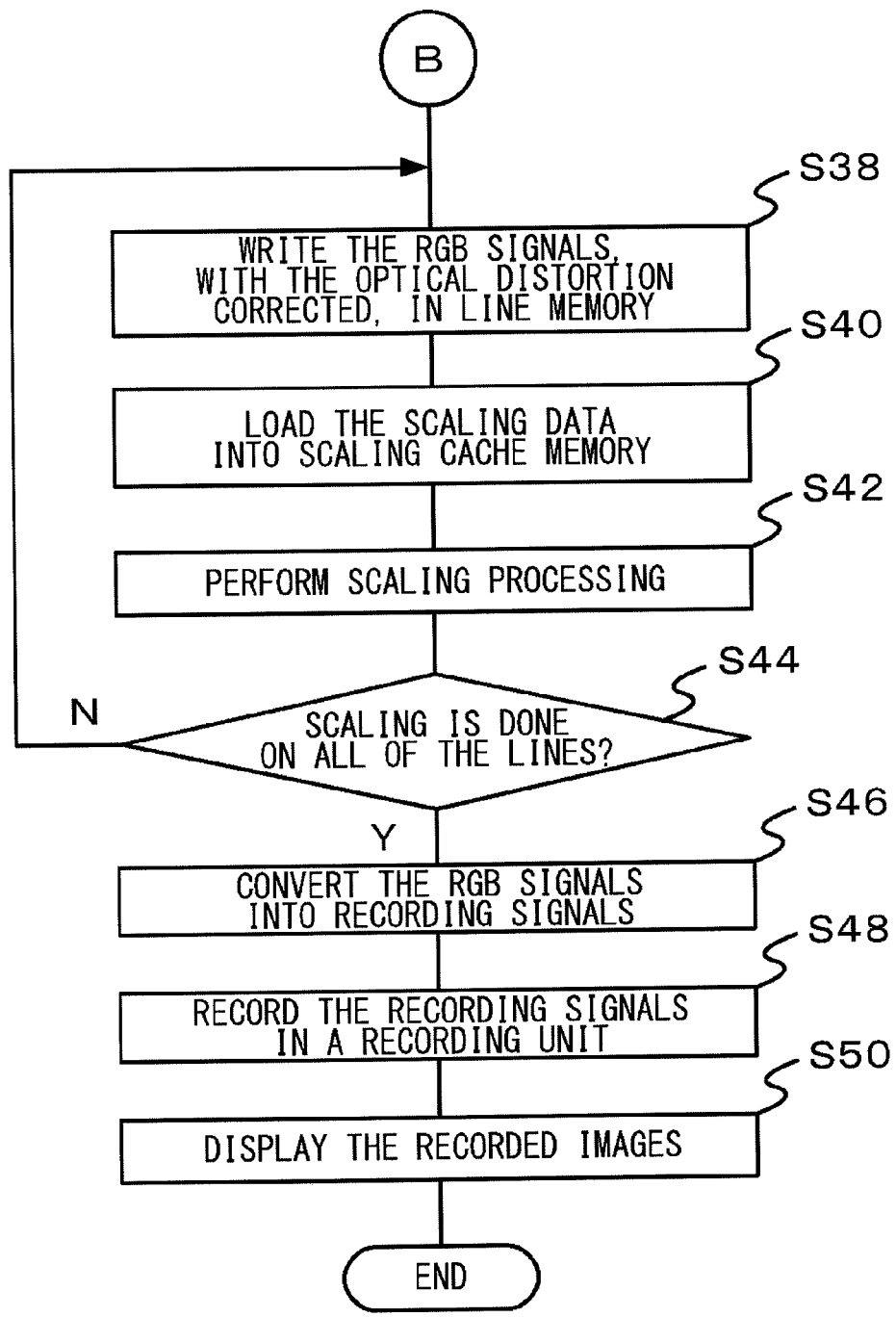
FIG. 14B is the latter half of a flowchart for explaining a flow of processings by an image correction apparatus according to a fourth embodiment.

FIG. 14B is the latter half of a flowchart for explaining the flow of processings by the image correction apparatus 103 according to the fourth embodiment.

The corrected image data write control unit 29 writes the image data, for which the optical distortion has been corrected, acquired from the distortion correction unit 11, into an area of the line memory 10 assigned for the corrected image data write control unit 29 (S38). The corrected image data read control unit 30 reads out the image data, for use in expansion/compression processing, required for the change of the image size from the line memory 10 sequentially so as to load them into the scaling cache memory 31 (S40). The scaling unit 32 expands or compresses the scaling image data read out from the scaling cache memory 31 (S42). If the expansion/compression processing has not been completed for all of the lines (N of S44), return to Step S38 and repeat the above-described processings. If the expansion/compression processing has been completed for all of the lines (Y of S44), the image post-processing unit 12 will perform signal conversions, such as conversion of signal specifications or compression, for the recording of expansion/compression-corrected RGB signals in the recording medium 14 (S46). The recording unit 13 records the image signals acquired from the image post-processing unit 12 in the recording medium 14 (S48). The output unit 15 displays the image signals recorded in the recording medium 14 according to the specifications for display by a not-shown display unit (S50).

As described above, the image correction apparatus 103 according to the fourth embodiment can realize a function of correcting the optical distortion while keeping the number of lines of the line memory and/or the size of cache memory register to a constant value. Moreover, the line memory is shared by a plurality of functions and the memory amount is allocated to each function. Thus, a multi-functional circuitry can be mounted simultaneously at low cost.

The present invention has been described based upon illustrative embodiments. Any arbitrary combination among the above-described first to fourth embodiments prove useful as another additional embodiment of the present invention. For example, the second embodiment and the fourth embodiment may be combined. That is, suppose that both the line memory maximum usage acquiring unit 22 and the memory allocation control unit 34 are provided. Then, the used amount of line memory required for the correction of the optical distortion can be dynamically allocated within the limit of data volume of the line memory 10, in addition to the advantageous effects of their respective embodiments.

Further, the third embodiment and the fourth embodiment may be combined, and the second embodiment, the third embodiment and the fourth embodiment may also be combined together. It should be understood that new embodiments realized by such combinations provide not only their own advantageous effects but also a combined advantageous effect as a whole on top of them.

The present invention has been described based upon illustrative embodiments. The above-described embodiments are intended to be illustrative only and it will be obvious to those skilled in the art that various modifications to the combination of constituting elements and processes could be developed and that such modifications are also within the scope of the present invention.

What is claimed is:

1. An image correction apparatus, comprising:
    a line memory for a predetermined number of lines configured to store sequentially image data obtained by image pickup via an optical lens;
    a distortion correction value storage configured to store a distortion correction value, which is a predetermined value to be used in a correction of optical distortion occurring in the image data due to distortion aberration present in the optical lens;
    an image data control unit configured to select pixels of image data stored in the line memory as pixels to be corrected for the correction of optical distortion respectively, configured to determine a region for use in correction having a fixed number of pixels horizontally and a fixed number of lines vertically, the region containing a plurality of pixels for use in correction of the pixels to be corrected, based on positions of the pixels to be corrected and distortion correction value obtained from the distortion correction value storage, and configured to read out image data within the region for use in correction from the line memory; and
    a distortion correction unit configured to determine pixel values for the pixels to be corrected based on (1) the pixels for use in correction, which are contained in the image data, within the region for use in correction, read out by the image data control unit, and (2) the distortion correction value,
    wherein when a size of optical distortion occurring in the image data exceeds a maximum value where the optical distortion is correctable using image data obtained from the line memory of the predetermined number of lines, the image data control unit adjusts the distortion correction value obtained from the distortion correction value storage in such a manner that a correction amount of optical distortion to be corrected by the distortion correction unit is within a range correctable using the image data obtained from the line memory.

2. An image correction apparatus according to claim 1, wherein the optical lens has a zoom function,
    wherein the distortion correction value storage stores zoom values of the optical lens and distortion correction values which are determined in association with respective zoom values,
    wherein the image data control unit obtains a zoom value of the optical lens, selects a zoom value stored in the distortion correction value storage, which is a value equivalent to the obtained zoom value or a value closest to the obtained zoom value, and determines the region for use in correction based on the distortion correction value corresponding to the selected zoom value and the positions of the pixels to be corrected, and
    wherein the distortion correction unit determines the pixel values of the pixels to be corrected based on the pixels for use in correction and the distortion correction value corresponding to the selected zoom value.

3. An image correction apparatus according to claim 1, wherein the predetermined number of lines of the line memory is greater than or equal to a number of lines with which image data necessary for a largest optical distortion among optical distortions occurring in the image data is obtained.

4. An image correction apparatus comprising:
    a line memory for a predetermined number of lines configured to store sequentially image data obtained by image pickup via an optical lens;
    a distortion correction value storage configured to store a distortion correction value, which is a predetermined value to be used in a correction of optical distortion occurring in the image data due to distortion aberration present in the optical lens;
    an image data control unit configured to select pixels of image data stored in the line memory as pixels to be corrected for the correction of optical distortion respectively, configured to determine a region for use in correction having a fixed number of pixels horizontally and a fixed number of lines vertically, the region containing a plurality of pixels for use in correction of the pixels to be corrected, based on positions of the pixels to be corrected and distortion correction value obtained from the distortion correction value storage, and configured to read out image data within the region for use in correction from the line memory;
    a distortion correction unit configured to determine pixel values for the pixels to be corrected based on (1) the pixels for use in correction, which are contained in the image data, within the region for use in correction, read out by the image data control unit, and (2) the distortion correction value;
    a processing unit configured to perform an additional image processing on the pixels corrected by the distortion correction unit wherein the additional image processing performed differs from a correction processing of optical distortion using a part of the line memory; and
    a memory allocation control unit configured to determine a first number of lines of the line memory usable by the distortion correction unit, according to a priority level between the correction processing of optical distortion performed by the distortion correction unit and the additional image processing performed by the processing unit,
    wherein when a size of optical distortion occurring in the image data exceeds a maximum value where the optical distortion is correctable using image data obtained from the line memory of the first number of lines, the image data control unit adjusts the distortion correction value obtained from the distortion correction value storage in such a manner that a correction amount of optical distortion to be corrected by the distortion correction unit is within a range correctable using the image data obtained from the line memory of the first number of lines.

5. An image correction apparatus according to claim 4, further comprising a memory allocation acquiring unit configured to receive input of maximum number of lines usable by the distortion correction unit, wherein the memory allocation control unit allocates the first number of lines in such a manner that the first number of lines is less than or equal to the maximum number of lines received by the memory allocation acquiring unit.

6. An image correction method, comprising:

storing sequentially image data obtained by image pickup via an optical lens, in a line memory for a predetermined number of lines;

acquiring a distortion correction value from a distortion correction value storage wherein the distortion correction value storage stores a distortion correction value, which is a predetermined value to be used in a correction of optical distortion occurring in the image data due to distortion aberration present in the optical lens;

selecting pixels of image data stored in the line memory as pixels to be corrected for the correction of optical distortion respectively;

determining a region for use in correction having a fixed number of pixels horizontally and a fixed number of lines vertically, the region containing a plurality of pixels for use in correction of the pixels to be corrected, based on positions of the pixels to be corrected and the distortion correction value obtained from the distortion correction value storage;

reading out image data within the region for use in correction, from the line memory; and determining pixel values for the pixels to be corrected based on (1) the pixels for use in correction, which are contained in the read out image data, within the region for use in correction, and (2) the distortion correction value, wherein when a size of optical distortion occurring in the image data exceeds a maximum value where the optical distortion is correctable using image data obtained from the line memory of the predetermined number of lines, adjusting the distortion correction value obtained from the distortion correction value storage in such a manner that a correction amount of optical distortion to be corrected is within a range correctable using the image data obtained from the line memory.

7. An image correction apparatus according to claim 4, wherein the predetermined number of lines of the line memory is greater than or equal to a number of lines with which image data necessary for a largest optical distortion among optical distortions occurring in the image data is obtained.

8. An image correction method, comprising:

storing sequentially image data obtained by image pickup via an optical lens, in a line memory for a predetermined number of lines;

acquiring a distortion correction value from a distortion correction value storage wherein the distortion correction value storage stores a distortion correction value, which is a predetermined value to be used in a correction of optical distortion occurring in the image data due to distortion aberration present in the optical lens;

selecting pixels of image data stored in the line memory as pixels to be corrected for the correction of optical distortion respectively;

determining a region for use in correction having a fixed number of pixels horizontally and a fixed number of lines vertically, the region containing a plurality of pixels for use in correction of the pixels to be corrected, based on positions of the pixels to be corrected and the distortion correction value obtained from the distortion correction value storage;

reading out image data within the region for use in correction, from the line memory;

determining pixel values for the pixels to be corrected based on (1) the pixels for use in correction, which are contained in the read out image data, within the region for use in correction, and (2) the distortion correction value, performing an additional image processing on the corrected pixels wherein the additional image processing performed differs from a correction processing of optical distortion using a part of the line memory; and determining a first number of lines of the line memory for the correction processing of optical distortion, according to a priority level between the correction processing of optical distortion and the additional image processing, wherein when a size of optical distortion occurring in the image data exceeds a maximum value where the optical distortion is correctable using image data obtained from the line memory of the first number of lines, adjusting the distortion correction value obtained from the distortion correction value storage in such a manner that a correction amount of optical distortion to be corrected is within a range correctable using the image data obtained from the line memory of the first number of lines.

* * * * *